(12) United States Patent
Iwamura et al.

(10) Patent No.: US 11,259,045 B2
(45) Date of Patent: Feb. 22, 2022

(54) IMAGE ENCODING DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

(*) Notice: Subject to any disclaimer, the term of this patent is extended or adjusted under 35 U.S.C. 154(b) by 0 days.

(21) Appl. No.: 17/036,854

(22) Filed: Sep. 29, 2020

(65) Prior Publication Data

US 2021/0014527 A1    Jan. 14, 2021

Related U.S. Application Data

(63) Continuation of application No. PCT/JP2019/014360, filed on Mar. 29, 2019.

(30) Foreign Application Priority Data

Mar. 29, 2018 (JP) .............................. JP2018-065880

(51) Int. Cl.
   *H04N 19/137* (2014.01)
   *H04N 19/573* (2014.01)
   (Continued)

(52) U.S. Cl.
   CPC ......... *H04N 19/573* (2014.11); *H04N 19/129* (2014.11); *H04N 19/137* (2014.11); *H04N 19/157* (2014.11); *H04N 19/176* (2014.11)

(58) Field of Classification Search
   None
   See application file for complete search history.

(56) References Cited

U.S. PATENT DOCUMENTS

2011/0122953 A1   5/2011   Nakagami et al.
2012/0263237 A1   10/2012  Koyama et al.
(Continued)

FOREIGN PATENT DOCUMENTS

JP    2000-059785 A   2/2000
WO   2010/010942 A1   1/2010
(Continued)

OTHER PUBLICATIONS

International Telecommunication Union, ITU-T, Telecommunication Standardization Sector of ITU, H-265, Series H: Audiovisual and Multimedia Systems Infrastructure of audiovisual services—Coding of moving video, "High efficiency video coding", Nov. 2019.
(Continued)

*Primary Examiner* — Christopher G Findley
(74) *Attorney, Agent, or Firm* — Studebaker & Brackett PC

(57) ABSTRACT

An image encoding device encodes a block-based target image. The image encoding device comprises, in a transform skip mode in which orthogonal transform processing of the target image is skipped, a motion compensation predictor configured to generate a prediction image corresponding to the target image by performing motion compensation prediction using a plurality of reference images, an evaluator configured to evaluate a degree of similarity between the plurality of reference images on a pixel-by-pixel basis, a subtractor configured to calculate prediction residuals each indicating a difference between the target image and the prediction image on a pixel-by-pixel basis, a rearranger configured to rearrange the prediction residuals based on a result of evaluation by the evaluator and an encoder configured to encode the prediction residuals rearranged by the rearranger.

2 Claims, 14 Drawing Sheets

(51) Int. Cl.
*H04N 19/129* (2014.01)
*H04N 19/157* (2014.01)
*H04N 19/176* (2014.01)

(56) References Cited

U.S. PATENT DOCUMENTS

| | | | |
|---|---|---|---|
| 2012/0263238 A1 | 10/2012 | Miyoshi et al. | |
| 2013/0107955 A1* | 5/2013 | Tanizawa | H04N 19/91 375/240.12 |
| 2014/0307780 A1* | 10/2014 | Cohen | H04N 19/176 375/240.03 |
| 2015/0063446 A1* | 3/2015 | Sugio | H04N 19/18 375/240.03 |
| 2018/0020214 A1* | 1/2018 | Wang | H04N 19/157 |
| 2019/0141335 A1* | 5/2019 | Nishi | H04N 19/139 |

FOREIGN PATENT DOCUMENTS

| | | |
|---|---|---|
| WO | 2011/080806 A1 | 7/2011 |
| WO | 2011/080807 A1 | 7/2011 |

OTHER PUBLICATIONS

Mrak et al., "Transform skip mode", Joint Collaborative Team on Video Coding (JCT-VC) of ITU-T SG16 WP3 and ISO/IEC/JTC1/SC29/WG11, JCTVC-F077_rl, 6 Meeting: Torino, IT, Jul. 14-22, 2011, pp. 1-9.

Iwamura et al., "Description of SOR and HOR video coding technology proposal by NHK and SHARP", Joint Video Exploration Team (JVET) of ITU-T SG 16 WP 3 and ISO/IEC JTC 1/SC 29/WG 11, JVET-J0027_vl, 10th Meeting: San Diego, US, Apr. 2018, pp. i, 1-10.

* cited by examiner

FIG. 8A

|   | 0 | 1 | 2 | 3 |
|---|---|---|---|---|
| 0 | 0 | 1 | 0 | 0 |
| 1 | 0 | 0 | 0 | -1 |
| 2 | 0 | 0 | -8 | 7 |
| 3 | 0 | 0 | 5 | 3 |

LastPositionX=1
LastPositionX=2
SigCoeffFlag=
　{1,0,1,0,1,1,1,1}
CoefGreater1=
　{0,0,1,1,1,1}
CoefGreater2=
　{1}
CoefAbsLevelRemaining=
　{0,5,3,6}
CoefSignFlag=
　{0,1,0,0,0,1}

FIG. 14A
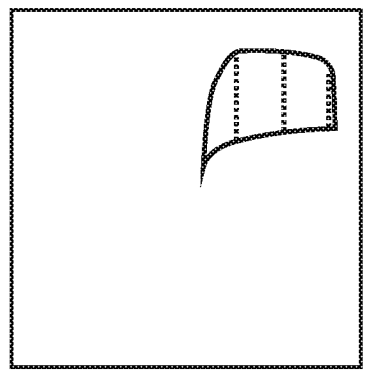
FIG. 14B
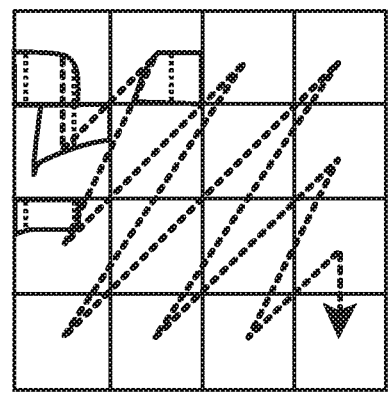
FIG. 14C
FIG. 14D
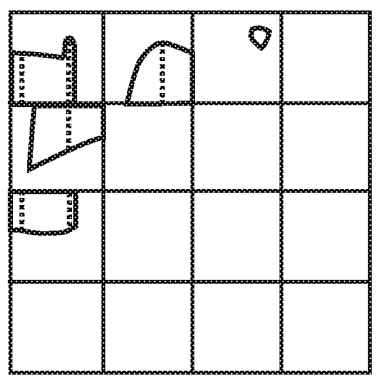

IMAGE ENCODING DEVICE, IMAGE DECODING DEVICE AND PROGRAM

TECHNICAL FIELD

The present invention relates to an image encoding device, an image decoding device and a program.

BACKGROUND ART

A conventionally known method for an encoding device to encode a target image (image block) involves performing motion compensation prediction using a plurality of reference images, generating a prediction image corresponding to the target image, performing an orthogonal transform of a prediction residual indicating a pixel-based difference between the target image and the prediction image to generate transform coefficients, quantizing the transform coefficients, and performing entropy encoding on the quantized transform coefficients. In motion compensation prediction using a plurality of reference images, a prediction image is typically generated by averaging the plurality of reference images.

Entropy encoding involves processing called serialization, which reads out two-dimensionally arrayed transform coefficients in a given scanning order and transforms them into a one-dimensional transform coefficient sequence, and the transform coefficients are sequentially encoded starting from the first transform coefficient in the one-dimensional transform coefficient sequence. In general, with an orthogonal transform, electric power is converged in low frequencies and electric power (values of transform coefficients) becomes zero in high frequencies. Thus, transform coefficients are read out in a scanning order from low to high frequencies and an end flag is set to the last significant coefficient (a non-zero coefficient), thereby efficiently encoding only significant coefficients (see Non-patent Literature 1, for example).

CITATION LIST

Non-Patent Literature

Non-patent Literature 1: Recommendation ITU-T H. 265, (12/2016), "High efficiency video coding", International Telecommunication Union

SUMMARY OF INVENTION

In HEVC (see Non-patent Literature 1), however, a transform skip mode in which orthogonal transform processing is not performed is also applicable in addition to a mode in which orthogonal transform processing is performed. When the transform skip mode is applied, it cannot be expected that electric power is converged in low frequencies because an orthogonal transform of prediction residuals is not performed. Thus, when entropy encoding is performed in the transform skip mode in the same manner as the mode in which an orthogonal transform is performed, efficient entropy encoding cannot be performed and encoding efficiency is decreased.

It is therefore an object of the present invention to provide an image encoding device, an image decoding device and a program that can improve encoding efficiency in a case of performing motion compensation prediction using a plurality of reference images.

An image encoding device according to a first feature encodes a block-based target image obtained by dividing an input image. The image encoding device comprises: in a transform skip mode in which orthogonal transform processing of the target image is skipped, a motion compensation predictor configured to generate a prediction image corresponding to the target image by performing motion compensation prediction using a plurality of reference images; an evaluator configured to evaluate a degree of similarity between the plurality of reference images on a pixel-by-pixel basis; a subtractor configured to calculate prediction residuals each indicating a difference between the target image and the prediction image on a pixel-by-pixel basis; a rearranger configured to rearrange the prediction residuals based on a result of evaluation by the evaluator; and an encoder configured to encode the prediction residuals rearranged by the rearranger.

An image decoding device according to a second feature decodes a block-based target image from encoded data. The image decoding device comprises: in a transform skip mode in which orthogonal transform processing of the target image is skipped, a motion compensation predictor configured to generate a prediction image corresponding to the target image by performing motion compensation prediction using a plurality of reference images; an evaluator configured to evaluate a degree of similarity between the plurality of reference images on a pixel-by-pixel basis; a decoder configured to decode the encoded data to acquire prediction residuals each indicating a difference between the target image and the prediction image on a pixel-by-pixel basis; and a rearranger configured to rearrange the prediction residuals based on a result of evaluation by the evaluator.

A program according to a third feature is a program for causing a computer to function as the image encoding device according to the first feature.

A program according to a fourth feature is a program for causing a computer to function as the image decoding device according to the second feature.

The present invention can provide an image encoding device, an image decoding device and a program that can improve encoding efficiency in a case of performing motion compensation prediction using a plurality of reference images.

BRIEF DESCRIPTION OF DRAWINGS

FIGS. 8A to 8C illustrate examples of rearrangement of prediction residuals.

FIGS. 14A to 14D illustrates an example of operations of a rearranger according to Modification 3 of the embodiment.

DESCRIPTION OF EMBODIMENT

Figure 1:
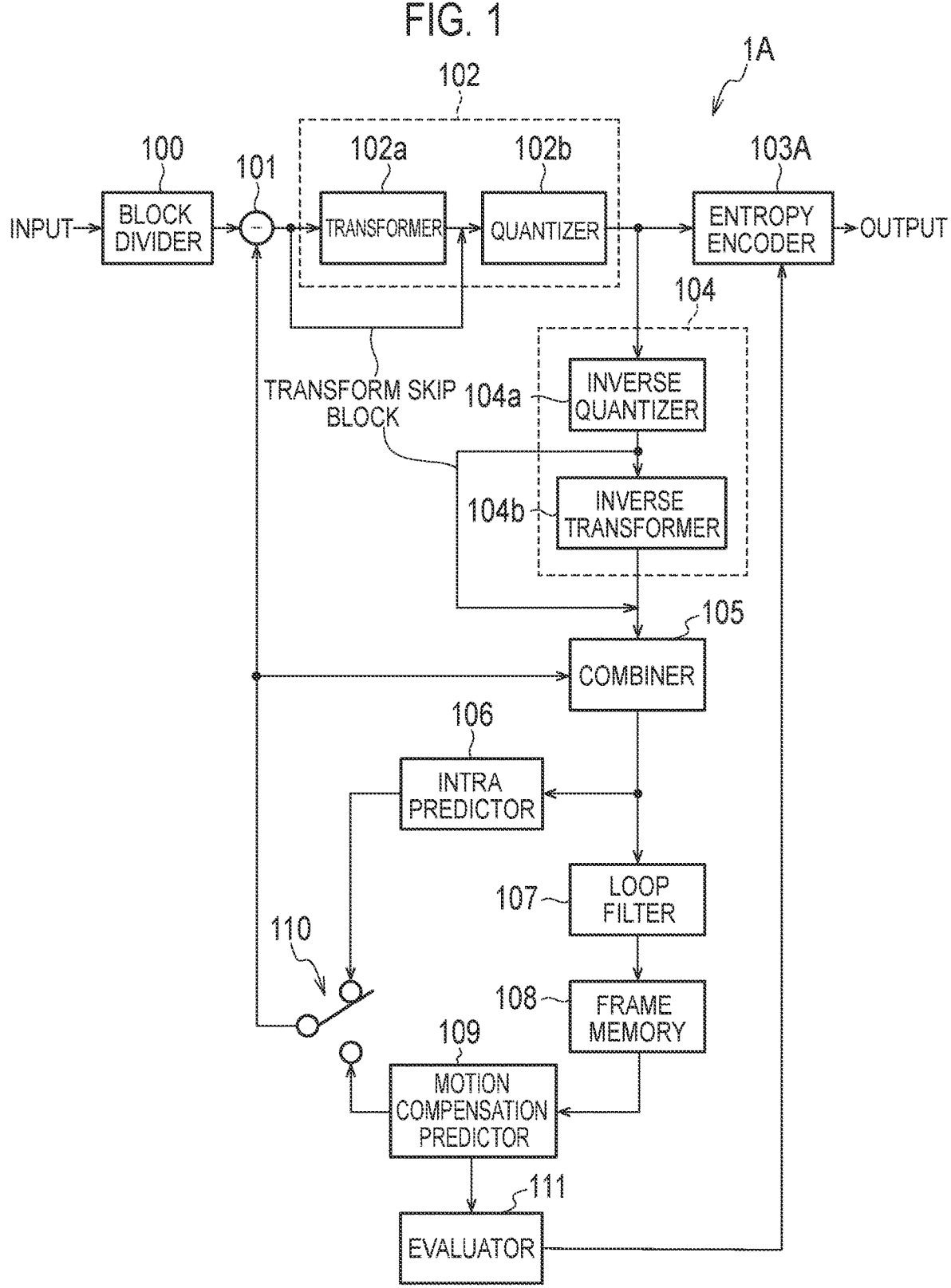
FIG. 1 illustrates a configuration of an image encoding device according to an embodiment.

An image encoding device and an image decoding device according to an embodiment are now described with reference to FIGS. 1 through 15. An image encoding device and an image decoding device according to the embodiment perform encoding and decoding of video represented by MPEG (Moving Picture Experts Group). In the description of drawings hereinbelow, the same or similar portions are given the same or similar reference numerals.

1. Configuration of Image Encoding Device

FIG. 1 illustrates a configuration of an image encoding device 1A according to the embodiment. As illustrated in FIG. 1, the image encoding device 1A includes a block divider 100, a subtractor 101, a transformer 102a, a quantizer 102b, an entropy encoder 103A, an inverse quantizer 104a, an inverse transformer 104b, a combiner 105, an intra predictor 106, a loop filter 107, a frame memory 108, a motion compensation predictor 109, a switcher 110, and an evaluator 111.

The block divider 100 divides an input image in a frame (or picture) unit into small areas in the form of blocks, and outputs the image blocks to the subtractor 101 (and to the motion compensation predictor 109). The image block has a size of 32×32 pixels, 16×16 pixels, 8×8 pixels, or 4×4 pixels, for example. However, the shape of the image block is not limited to a square and it may be rectangular. The image block is the unit by which the image encoding device 1A performs encoding and also the unit by which an image decoding device 2A (see FIG. 2) performs decoding, and such an image block is referred to as a target image block. The image block may also be referred to as a coding unit (CU) or a coding block (CB).

The subtractor 101 calculates a prediction residual, which indicates the pixel-based difference between the target image block input from the block divider 100 and a prediction image (prediction image block) corresponding to the target image block. Specifically, the subtractor 101 calculates the prediction residuals by subtracting the respective pixel values of the prediction image from the respective pixel values of the target image block, and outputs the calculated prediction residuals to the transformer 102a. Note that the prediction image is input to the subtractor 101 from the intra predictor 106 or the motion compensation predictor 109, discussed later, via the switcher 110.

The transformer 102a and the quantizer 102b configure a transformer/quantizer 102 which performs orthogonal transform processing and quantization processing in a block unit.

The transformer 102a performs an orthogonal transform of the prediction residuals input from the subtractor 101 to calculate a transform coefficient for each frequency component, and outputs the calculated transform coefficients to the quantizer 102b. Orthogonal transform refers to discrete cosine transform (DCT), discrete sine transform (DST), Karhunen-Loeve Transform (KLT) etc., for example. Orthogonal transform is a process to convert a residual signal for a pixel area into frequency domain. In an orthogonal transform, electric power is generally converged in low frequencies due to the orthogonal transform.

The quantizer 102b quantizes the transform coefficients input from the transformer 102a with a quantization parameter (Qp) and a quantization matrix to generate transform coefficients that have been quantized (quantized transform coefficients). The quantization parameter (Qp) is a parameter which is applied to the transform coefficients within a block in common and is a parameter defining the roughness of quantization. The quantization matrix is a matrix having quantization values for use in quantization of the respective transform coefficients as its elements. The quantizer 102b outputs the generated quantized transform coefficients to the entropy encoder 103A and the inverse quantizer 104b.

The entropy encoder 103A performs entropy encoding on the quantized transform coefficients input from the quantizer 102b, compresses data to generate encoded data (a bit stream), and outputs the encoded data outside the image encoding device 1A. For entropy encoding, Huffman code, Context-based Adaptive Binary Arithmetic Coding (CABAC) and the like can be used. Entropy encoding involves processing called serialization, which reads out two-dimensionally arrayed transform coefficients in a given scanning order and transforms them into a one-dimensional transform coefficient sequence, and the transform coefficients are sequentially encoded starting from the first transform coefficient in the one-dimensional transform coefficient sequence. In general, with an orthogonal transform, electric power is converged in low frequencies and electric power (values of transform coefficients) becomes zero in high frequencies. Thus, transform coefficients are read out in a scanning order from low to high frequencies and an end flag is set to the last significant coefficient, thereby efficiently encoding only significant coefficients.

To the entropy encoder 103A, information on prediction is input from the intra predictor 106 and the motion compensation predictor 109, and information on filter processing is input from the loop filter 107. The entropy encoder 103A performs entropy encoding of these pieces of information as well. When the transform skip mode is applied to the target image block, the entropy encoder 103A includes a flag indicative of it (a transform skip flag) into encoded data.

The inverse quantizer 104a and the inverse transformer 104b configure an inverse quantizer/inverse transformer 104 which performs inverse quantization processing and inverse orthogonal transform processing in a block unit.

The inverse quantizer 104a performs inverse quantization processing corresponding to the quantization processing performed by the quantizer 102b. Specifically, the inverse quantizer 104a restores the transform coefficients by performing inverse quantization of the quantized transform coefficients input from the quantizer 102b using the quantization parameter (Qp) and the quantization matrix, and outputs the restored transform coefficients to the inverse transformer 104b.

The inverse transformer 104b performs inverse orthogonal transform processing corresponding to the orthogonal transform processing performed by the transformer 102a. For example, in a case where the transformer 102a performs discrete cosine transform, the inverse transformer 104b performs inverse discrete cosine transform. The inverse transformer 104b restores the prediction residual by performing an inverse orthogonal transform of the transform coefficients input from the inverse quantizer 104a and outputs the restored prediction residual to the combiner 105.

The combiner 105 combines the restored prediction residual input from the inverse transformer 104b with the prediction image input from the switcher 110 in a pixel unit. The combiner 105 reconstructs the target image block by adding respective pixel values of the restored prediction residual and respective pixel values of the prediction image and outputs the reconstructed image which is the reconstructed target image block to the intra predictor 106 and the loop filter 107.

The intra predictor 106 performs intra prediction using the reconstructed image input from the combiner 105 to generate an intra-predicted image, and outputs the intra-predicted image to the switcher 110. The intra predictor 106 also outputs information on an intra prediction mode selected and the like to the entropy encoder 103A.

The loop filter 107 performs filter processing as post-processing on the reconstructed image input from the combiner 105, and outputs the reconstructed image after the filter processing to the frame memory 108. The loop filter 107 also outputs information on the filter processing to the entropy encoder 103A. The filter processing includes deblocking filter processing and sample adaptive offset processing.

The frame memory 108 stores the reconstructed image input from the loop filter 107 in a frame unit.

The motion compensation predictor 109 performs inter prediction which uses one or more reconstructed images stored in the frame memory 108 as (a) reference image(s). Specifically, the motion compensation predictor 109 calculates a motion vector by means of block matching and the like, generates a motion compensation prediction image based on the motion vector, and outputs the motion compensation prediction image to the switcher 110. The motion compensation predictor 109 also outputs information on the motion vector to the entropy encoder 103A.

The switcher 110 switches between the intra-predicted image input from the intra predictor 106 and the motion compensation prediction image input from the motion compensation predictor 109, and outputs the prediction image (the intra-predicted image or the motion compensation prediction image) to the subtractor 101 and the combiner 105.

Meanwhile, in the transform skip mode, the target image block output by the block divider 100 is transformed to prediction residuals at the subtractor 101 and then quantized without being subjected to an orthogonal transform. Specifically, the prediction residuals output by the subtractor 101 skip the orthogonal transform at the transformer 102a and are input to the quantizer 102b. The quantizer 102b quantizes the prediction residuals for the target image block which skips the orthogonal transform (hereinafter called a "transform skip block"), and outputs the quantized prediction residuals to the entropy encoder 103A and the inverse quantizer 104b.

For the transform skip block, the entropy encoder 103A performs entropy encoding on the quantized prediction residuals input from the quantizer 102b, compresses data to generate encoded data (a bit stream), and outputs the encoded data outside the image encoding device 1A. In this case, entropy encoding reads out two-dimensionally arrayed prediction residual values in a given scanning order and transforms them into a one-dimensional prediction residual sequence through serialization.

For the transform skip block, the inverse quantizer 104a performs inverse quantization processing corresponding to the quantization processing performed by the quantizer 102b. For the transform skip block, the inverse transformer 104b skips inverse orthogonal transform processing. Thus, the prediction residuals restored by the inverse quantizer 104a are input to the combiner 105 without going through inverse orthogonal transform processing.

In a case where the motion compensation predictor 109 performs motion compensation prediction using a plurality of reference images, for the transform skip block, the evaluator 111 evaluates a degree of similarity between the plurality of reference images on a pixel-by-pixel basis and outputs information on the result of evaluation to the entropy encoder 103A. For the transform skip block, the entropy encoder 103A sequentially encodes the prediction residuals input from the quantizer 102b starting from a pixel position at which the degree of similarity between the reference images is low based on the result of evaluation by the evaluator 111. Details of the evaluator 111 and the entropy encoder 103A are discussed later.

2. Configuration of Image Decoding Device

Figure 2:
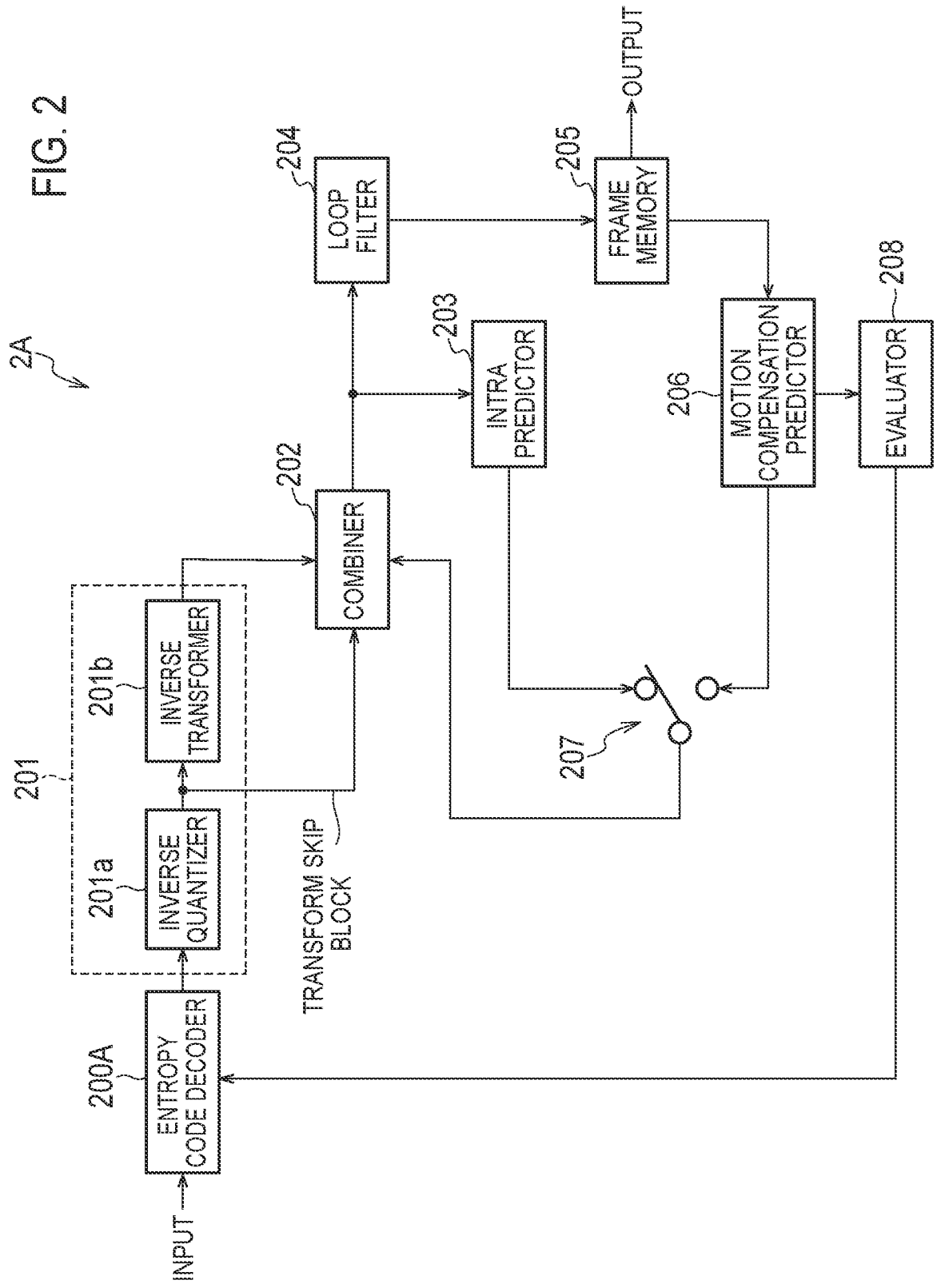
FIG. 2 illustrates a configuration of an image decoding device according to the embodiment.

FIG. 2 illustrates a configuration of the image decoding device 2A according to the embodiment. As illustrated in FIG. 2, the image decoding device 2A includes an entropy code decoder 200A, an inverse quantizer 201a, an inverse transformer 201b, a combiner 202, an intra predictor 203, a loop filter 204, a frame memory 205, a motion compensation predictor 206, a switcher 207, and an evaluator 208.

The entropy code decoder 200A decodes the encoded data generated by the encoding device 1 and outputs quantized transform coefficients to the inverse quantizer 201a. The entropy code decoder 200A also decodes the encoded data to acquire information on prediction (intra prediction and motion compensation prediction) and information on the filter processing. The entropy code decoder 200A outputs the information on prediction to the intra predictor 203 and the motion compensation predictor 206, and outputs the information on the filter processing to the loop filter 204.

The inverse quantizer 201a and the inverse transformer 201b configure an inverse quantizer/inverse transformer 201 which performs inverse quantization processing and inverse orthogonal transform processing in a block unit.

The inverse quantizer 201a performs inverse quantization processing corresponding to the quantization processing performed by the quantizer 102b of the image encoding device 1A. The inverse quantizer 201a restores the transform coefficients by performing inverse quantization of the quantized transform coefficients input from the entropy code decoder 200A using the quantization parameter (Qp) and the quantization matrix, and outputs the restored transform coefficients to the inverse transformer 201b.

The inverse transformer 201b performs inverse orthogonal transform processing corresponding to the orthogonal transform processing performed by the transformer 102a of the image encoding device 1A. The inverse transformer 104b performs an inverse orthogonal transform of the transform coefficients input from the inverse quantizer 104a to restore the prediction residuals, and outputs restored prediction residuals to the combiner 202.

The combiner 202 reconstructs the original target image block by combining the prediction residual input from the inverse transformer 201b with the prediction image input from the switcher 207 in a pixel unit, and outputs the reconstructed image to the intra predictor 203 and the loop filter 204.

The intra predictor 203 generates an intra-predicted image by performing intra prediction according to the intra prediction information input from the entropy code decoder 200A with reference to the reconstructed image input from the combiner 202, and outputs the intra-predicted image to the switcher 207.

The loop filter 204 performs filter processing similar to that performed by the loop filter 107 of the image encoding device 1A on the reconstructed image input from the combiner 202 based on the filter processing information input from the entropy code decoder 200A, and outputs the reconstructed image after the filter processing to the frame memory 205.

The frame memory 205 stores the reconstructed image input from the loop filter 204 in a frame unit. The frame memory 205 outputs the stored reconstructed image outside the image decoding device 2A.

The motion compensation predictor 206 generates a motion compensation prediction image by performing motion compensation prediction (inter prediction) in accordance with the motion vector information input from the entropy code decoder 200A using one or more reconstructed images stored in the frame memory 205 as (a) reference image(s), and outputs the motion compensation prediction image to the switcher 207.

The switcher 207 switches between the intra-predicted image input from the intra predictor 203 and the motion compensation prediction image input from the motion compensation predictor 206 and outputs the prediction image (the intra-predicted image or the motion compensation prediction image) to the combiner 202.

Meanwhile, for the transform skip block, the entropy code decoder 200A decodes the encoded data generated by the encoding device 1 and outputs the quantized prediction residuals to the inverse quantizer 201a.

For the transform skip block, the inverse quantizer 201a performs inverse quantization processing corresponding to the quantization processing performed by the quantizer 102b of the image encoding device 1A. For the transform skip block, the inverse transformer 201b skips inverse orthogonal transform processing. Thus, the prediction residuals restored by the inverse quantizer 201a are input to the combiner 202 without going through inverse orthogonal transform processing.

The evaluator 208 performs similar operations to those of the evaluator 111 of the image encoding device 1A. Specifically, in a case where the motion compensation predictor 206 performs motion compensation prediction using a plurality of reference images, for the transform skip block, the evaluator 208 evaluates the degree of similarity between the plurality of reference images on a pixel-by-pixel basis and outputs information on the result of evaluation to the entropy code decoder 200A. For the transform skip block, the entropy code decoder 200A decodes the encoded data to acquire the prediction residuals on a pixel-by-pixel basis. The entropy code decoder 200A rearranges the prediction residuals into the original order based on the result of evaluation by the evaluator 208 and outputs them. Details of the evaluator 208 and the entropy code decoder 200A are discussed later.

(1.3. Motion Compensation Prediction)

Figure 3:
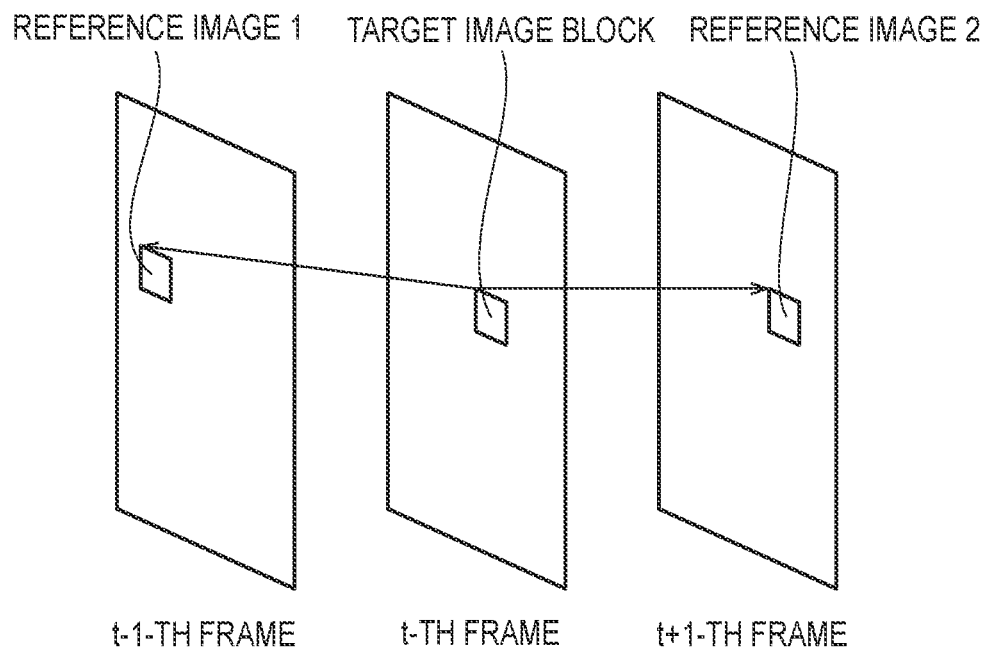
FIG. 3 illustrates an example of motion compensation prediction according to the embodiment.
Figure 4:
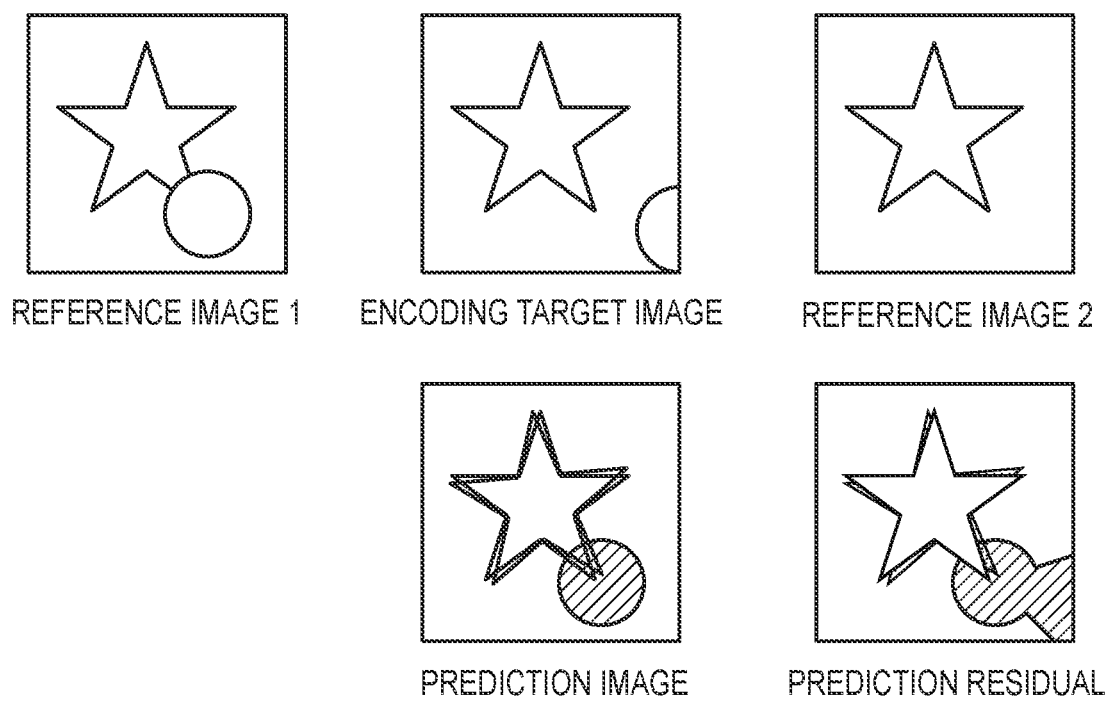
FIG. 4 illustrates an example of a prediction image generated by motion compensation prediction according to the embodiment.

FIG. 3 illustrates an example of motion compensation prediction. FIG. 4 illustrates an example of the prediction image generated through motion compensation prediction. A case will be described as a simple example of the motion compensation prediction where bi-prediction used in HEVC, particularly, forward direction and backward prediction (bi-directional prediction) are used.

As illustrated in FIG. 3, the motion compensation prediction is performed with reference to temporally preceding and subsequent frames with respect to a target frame (current frame). In the example in FIG. 3, motion compensation prediction of a block in an image of a t-th frame is performed with reference to a t−1-th frame and a t+1-th frame. In the motion compensation, portions (blocks) within the t−1-th reference frame and the t+1-th reference frame, which are similar to the target image block are detected from a search range set at a system.

Detected portions represent reference images. Information indicating the relative positions of the reference images with respect to the target image block is the arrows in the figure, called a motion vector. Information on the motion vector is encoded at the image encoding device 1A by entropy encoding along with frame information for the reference images. Meanwhile, the image decoding device 2A detects the reference images based on the information on the motion vector generated by the image encoding device 1A.

As illustrated in FIG. 3 and FIG. 4, reference images 1 and 2 detected through motion compensation are similar partial images aligned with the target image block, within the frames to be referred to, and are thus regarded as images similar to the target image block (encoding target image). In the example in FIG. 4, the target image block includes a design of a star and a design of a partial circle. The reference image 1 includes a design of a star and a design of the entire circle. The reference image 2 includes a design of a star, but does not include a design of a circle.

A prediction image is generated from such reference images 1 and 2. As prediction processing is processing of high processing load, a prediction image is typically generated by averaging the reference images 1 and 2. However, a prediction image may also be generated using more advanced processing in combination, e.g., signal enhancement with a low pass filter or a high pass filter. Here, since the reference image 1 contains the circle design and the reference image 2 does not, generating a prediction image by the averaging of the reference images 1 and 2 results in a halved signal relative to the reference image 1 for the circle design in the prediction image.

The difference between the prediction images obtained from the reference images 1 and 2 and the target image block (the encoding target image) is the prediction residual. In the prediction residual illustrated in FIG. 4, although large differences exist only in misalignment portions at some edges of the star design and in a portion where the circle design is misaligned (the shaded portions), prediction has been done accurately in the other portions, causing no differences.

The portions where no differences exist (non-edge portions of the star design and the background portion) are portions where the reference image 1 and the reference image 2 have high degree of similarity and accurate prediction has been performed. By contrast, the portions where large differences exist are portions specific to each reference image, that is, where the degree of similarity between the reference image 1 and the reference image 2 is significantly low. Thus, it can be seen that a portion where the degree of similarity between the reference image 1 and the reference image 2 is significantly low gives rise to a large difference (prediction residual) with low accuracy of prediction.

Also, when the transform skip mode is applied, it cannot be expected that electric power is converged in low frequencies because an orthogonal transform of the target image block (the transform skip block) is not performed. Thus, if entropy encoding is performed in the transform skip mode in the same method as the mode in which an orthogonal transform is performed, efficient entropy encoding cannot be performed and encoding efficiency is decreased.

In the embodiment, for the transform skip block, the evaluator 111 evaluates the degree of similarity between a plurality of reference images on a pixel-by-pixel basis, and outputs information on the result of evaluation to the entropy encoder 103A. For the transform skip block, the entropy encoder 103A sequentially encodes the prediction residuals input from the quantizer 102b starting from a pixel position at which the degree of similarity between the reference images is low, based on the result of evaluation by the evaluator 111.

Here, for the transform skip block, a pixel position at which the degree of similarity between the plurality of reference images is low can be considered to have a large prediction residual. By contrast, a pixel position at which the degree of similarity between the plurality of reference images is high can be considered to have zero prediction residual. Thus, by the entropy encoder 103A encoding the prediction residuals starting from a pixel position at which the degree of similarity between the reference images is low, significant coefficients can be preferentially encoded and an end flag can be set earlier. Accordingly, efficient entropy encoding becomes possible and encoding efficiency can be improved.

4. Evaluator

Figure 5:
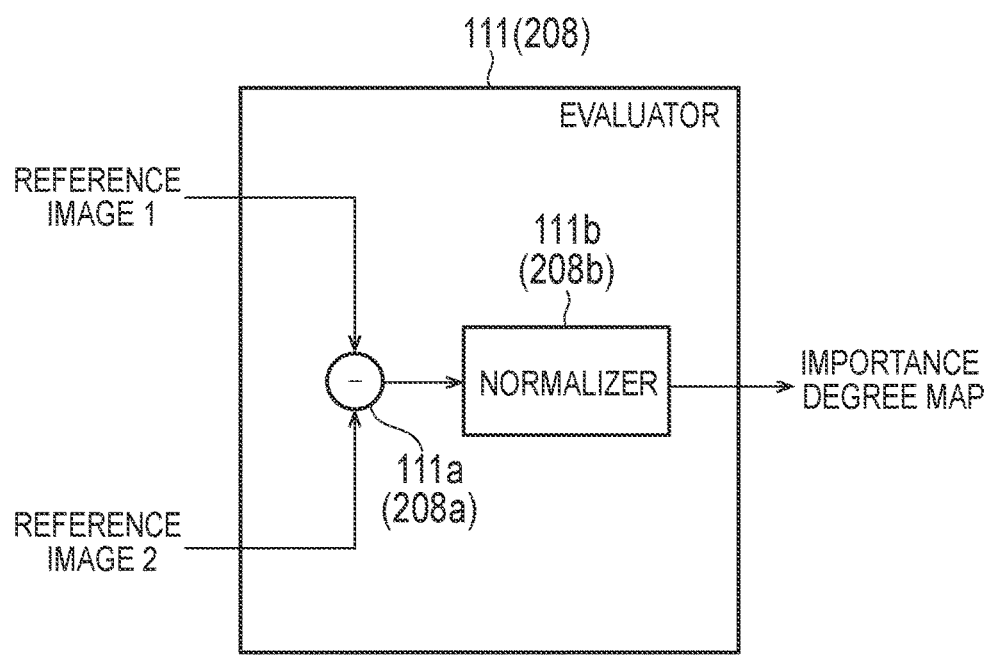
FIG. 5 illustrates an example of a configuration of an evaluator according to the embodiment.

FIG. 5 illustrates an example of a configuration of the evaluator 111 in the image encoding device 1A. As illustrated in FIG. 5, the evaluator 111 includes a similarity degree calculator 111a and a normalizer 111b.

The similarity degree calculator 111a calculates the degree of similarity between the reference images 1 and 2 input from the motion compensation predictor 109 on a pixel-by-pixel basis (i.e., for each pixel position), and outputs the calculated degrees of similarity to the normalizer 111b. For the degree of similarity, a difference value can be used, for example. As the difference value is smaller, the degree of similarity can be considered to be higher, and as the difference value is greater, the degree of similarity can be considered to be lower. The similarity degree calculator 111a may also calculate the difference value after performing filter processing on the reference images. The similarity degree calculator 111a may calculate statistics such as a square error and use the statistics as the degree of similarity. The following description is for a case where a difference value is used as the degree of similarity.

The normalizer 111b normalizes the difference value input from the similarity degree calculator 111a with a difference value that maximizes the difference value in the block (i.e., a maximum value of the difference value within the block), and outputs it. The normalized difference value is used as a degree of importance for determining the order of encoding at the entropy encoder 103A. A smaller difference value has lower degree of importance in encoding because the degree of similarity will be higher and prediction accuracy will also be higher. By contrast, a greater difference value has higher degree of importance in encoding because the degree of similarity will be lower and prediction accuracy will also be lower. For this reason, the entropy encoder 103A encodes prediction residuals for pixel positions of higher degree of importance preferentially.

The normalizer 111b may adjust the normalized difference value (significance) input from the normalizer 111b based on at least one of the quantization parameter (Qp) defining the roughness of quantization and the quantization matrix from which a different quantization value is applied to each transform coefficient, and output it.

A degree of importance Rij of each frequency component (ij) output by the evaluator 111 can be represented as Expression (1) below, for example:

$$Rij = (\text{abs}(Xij - Yij)/\text{max}D \times \text{Scale}(Qp)) \quad (1)$$

In Expression (1), Xij is the pixel value at pixel position ij in the reference image 1, Yij is the pixel value at pixel position ij in the reference image 2, and abs is a function to obtain an absolute value. The similarity degree calculator 111a outputs abs(Xij−Yij).

In Expression (1), maxD is the maximum value of the difference value abs (Xij−Yij) in the block. While determination of maxD requires determination of difference values for all of the pixel positions in the block, in order to omit this process, the maximum value for an adjacent block which has already been subjected to encoding processing may be substituted. Alternatively, maxD may be determined from the quantization parameter (Qp) or a quantization value of the quantization matrix by using a table defining the correspondence between the quantization parameter (Qp) or the quantization values of the quantization matrix and maxD. Alternatively, a fixed value predefined in specifications may be used as maxD. The normalizer 111b outputs abs(Xij−Yij)/maxD.

In Expression (1), Scale(Qp) is a coefficient which is multiplied in accordance with the quantization parameter (Qp) or a quantization value of the quantization matrix. Scale(Qp) is designed to approach 1.0 when Qp or a quantization value of the quantization matrix is greater and to approach 0 when it is smaller, and the degree thereof is adjusted by a system. Alternatively, a fixed value predefined in specifications may be used as Scale(Qp). The normalizer 111b outputs abs(Xij−Yij)/maxD×Scale(Qp) as the degree of importance Rij.

The degree of importance Rij calculated in this manner is a value in a range of 0 to 1.0. Essentially, the degree of importance Rij approaches 1.0 when the difference value at the pixel position ij is large (i.e., the prediction accuracy is low) and approaches 0 when it is small (i.e., the prediction accuracy is high). When a substitute value such as a fixed value is used as maxD or Scale (Qp), however, there can be a case where the degree of importance Rij exceeds 1.0 or falls below 0, in which case 1.0 or 0 may be clipped. The evaluator 111 outputs map information composed of the degree of importance Rij at each pixel position ij in the block to the entropy encoder 103A.

Alternatively, the evaluator 111 may calculate Rij as in Expression (2):

$$Rij = 1 - (\text{abs}(Xij - Yij)/\text{max}D \times \text{Scale}(Qp)) \quad (2)$$

When Expression (2) is used, Rij approaches 0 when the difference value at the pixel position ij is large (i.e., prediction accuracy is low) and approaches 1 when it is small (i.e., prediction accuracy is high). Thus, Rij can be considered to be a value representing the prediction accuracy (degree of accuracy) for the pixel position ij. The following description is for a case where the evaluator 111 outputs map information composed of the degree of accuracy Rij at each pixel position ij in a block using Expression (2), and such map information is called a "degree-of-accuracy map" where appropriate.

The evaluator 111 may perform, for the transform skip block, evaluation (calculation of the degree of accuracy Rij) only when motion compensation prediction using a plurality of reference images is applied and may not perform evaluation (calculation of the degree of accuracy Rij) in other modes, e.g., in unidirectional prediction or intra prediction processing.

The evaluator 208 in the image decoding device 2A is configured in a similar manner to the evaluator 111 in the image encoding device 1A. Specifically, the evaluator 208 in the image decoding device 2A includes a similarity degree calculator 208a and a normalizer 208b. The evaluator 208 in the image decoding device 2A outputs a degree-of-accuracy map composed of the degree of accuracy Rij at each pixel position ij in the block to the entropy code decoder 200A.

5. Entropy Encoder

Figure 6:
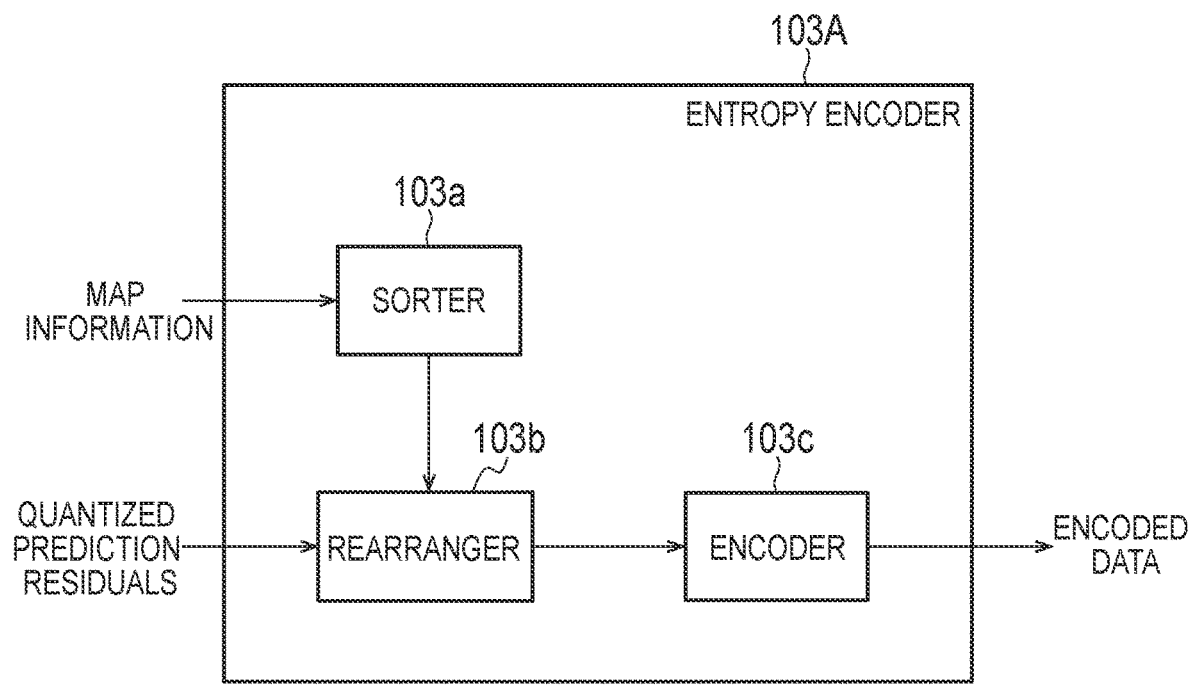
FIG. 6 illustrates an example of a configuration of an entropy encoder according to the embodiment.

FIG. 6 illustrates an example of a configuration of the entropy encoder 103A. FIG. 7 illustrates an exemplary generation of degree-of-accuracy indices. FIG. 8 illustrates an example of rearrangement of prediction residuals.

As illustrated in FIG. 6, the entropy encoder 103A includes a sorter 103a, a rearranger 103b, and an encoder 103c.

Figures 7A, 7B:
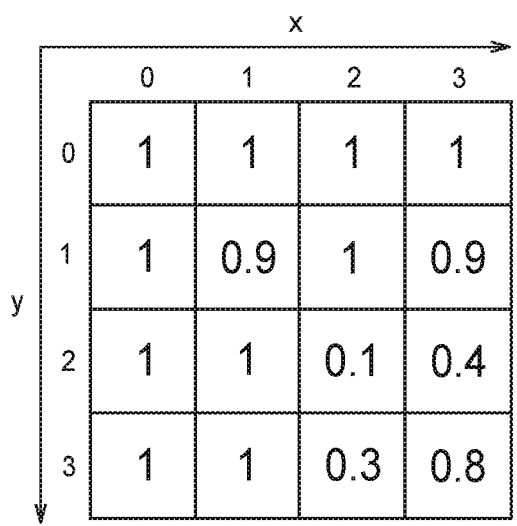
FIGS. 7A and 7B illustrate an exemplary generation of degree-of-accuracy indices.

The sorter 103a rearranges the degrees of accuracy Rij in the degree-of-accuracy map input from the evaluator 111 in descending order. Specifically, as illustrated in FIG. 7A, the degrees of accuracy Rij are two-dimensionally arrayed in the degree-of-accuracy map, so the sorter 103a serializes the degree-of-accuracy map by zigzag scan (a scanning order from upper left to lower right), for example, into a degree-of-accuracy sequence. Then, as illustrated in FIG. 7B, the sorter 103a rearranges the degrees of accuracy Rij in ascending order, and outputs to the rearranger 103b degree-of-accuracy index information, in which an index i and a pixel position (the X-coordinate position and the Y-coordinate position) are associated with each other, where the index i is the degree of accuracy Rij.

In the example of FIG. 7A, the degree of accuracy at pixel position (x, y)=(2, 2) is lowest, the degree of accuracy at pixel position (x, y)=(2, 3) is the second lowest, the degree of accuracy at pixel position (x, y)=(3, 2) is the third lowest, and the degree of accuracy at pixel position (x, y)=(3, 3) is the fourth lowest. An area consisting of such pixel positions can be estimated to have low prediction accuracy and produce a large prediction residual. By contrast, for a pixel position with the degree of accuracy being 1, it can be estimated to have high prediction accuracy and produce no prediction residual.

For the transform skip block, the rearranger 103b rearranges the prediction residuals input from the quantizer 102b based on the degree-of-accuracy index information input from the sorter 103a. Specifically, the rearranger 103b rearranges the prediction residuals on a pixel-by-pixel basis such that prediction residuals are sequentially encoded starting from a pixel position at which the degree of accuracy is low (i.e., a pixel position where the degree of similarity between the reference images is low).

The prediction residuals illustrated in FIG. 8A are two-dimensionally arrayed. The rearranger 103b rearranges the prediction residuals so that prediction residuals for pixel positions with low degree of accuracy are converged into an upper left area as illustrated in FIG. 8B, based on the degree-of-accuracy index information input from the sorter 103a. Herein, zigzag scan (diagonal scan) is assumed as the scanning order, where the rearranger 103b performs scan in an order from an upper left area to a lower right area, preferentially serializes the prediction residuals for pixel positions with low degree of accuracy, and outputs a prediction residual sequence in which the prediction residuals are arranged in ascending order of the degree of accuracy (i.e., in ascending order of the degree of similarity between the reference images) to the encoder 103c. The scanning order is not limited to zigzag scan, however; horizontal scan or vertical scan may be used instead. Also, the rearranger 103b may perform rearrangement after scanning, rather than performing rearrangement prior to scanning.

Alternatively, instead of a fixed scanning order such as zigzag scan, horizontal scan and vertical scan, the rearranger 103b may determine a variable scanning order such that prediction residuals are sequentially scanned starting from a pixel position with lower degree of accuracy and perform scan in the determined scanning order, thereby outputting a prediction residual sequence in which prediction residuals are arranged in ascending order of the degree of accuracy to the encoder 103c.

The encoder 103c encodes the prediction residuals in the prediction residual sequence input from the rearranger 103b and outputs encoded data. The encoder 103c determines the last significant coefficient contained in the prediction residual sequence input from the rearranger 103b, and performs encoding from the head of the prediction residual sequence to the last significant coefficient. The encoder 103c efficiently encodes significant coefficients by determining whether each coefficient is a significant coefficient or not sequentially from the head of the prediction residual sequence input from the rearranger 103b, setting an end flag to the last significant coefficient, and not encoding prediction residuals (i.e., zero coefficients) after the end flag.

For example, as illustrated in FIG. 8C, the encoder 103c encodes the last significant coefficient in the serialized prediction residual sequence, namely the coordinate position of (X=1, Y=2) in FIG. 8B, as last_sig_coeff_x and y (the end flag). Then, the encoder 103c encodes whether a significant coefficient exists or not as sig_coeff_flag starting from the position of the last significant coefficient (1, 2) in the reverse order of the scanning order, that is, in an order going from (3, 3) toward (0, 0). In the sig_coeff_flag, a coordinate position at which a significant coefficient exists is indicated by "1" and a coordinate position at which a significant coefficient does not exist is indicated by "0". Further, the encoder 103c encodes whether a significant coefficient is greater than 1 or not as coeff_abs_level_greater1_flag, and encodes whether the significant coefficient is greater than 2 or not as coeff_abs_level_greater2_flag. For a significant coefficient greater than 2, the encoder 103c encodes an absolute value of the significant coefficient minus 3 as coeff_abs_level_remaining, and also encodes a flag indicative of the sign of the significant coefficient as coeff_sign_flag.

In such entropy encoding, the further in a lower right area (later in the scanning order) the last significant coefficient is located, the values of last_sig_coeff_x and y become greater and the amount of Sig_coeff_flag increases, increasing the amount of information produced by entropy encoding. However, by performing rearrangement such that prediction residuals are sequentially encoded starting from a pixel position at which the degree of accuracy is low (i.e., a pixel position where the degree of similarity between the reference images is low), the values of Last_sig_coeff_x and y are made small and the amount of Sig_coeff_flag is decreased, so that the amount of information produced by entropy encoding can be reduced.

The entropy encoder 103A performs rearrangement processing by the degree of accuracy for the transform skip block only when motion compensation prediction using a plurality of reference images is applied. In other modes, such as in unidirectional prediction and intra prediction processing, the entropy encoder 103A does not have to perform rearrangement processing by the degree of accuracy.

6. Entropy Code Decoder

Figure 9:
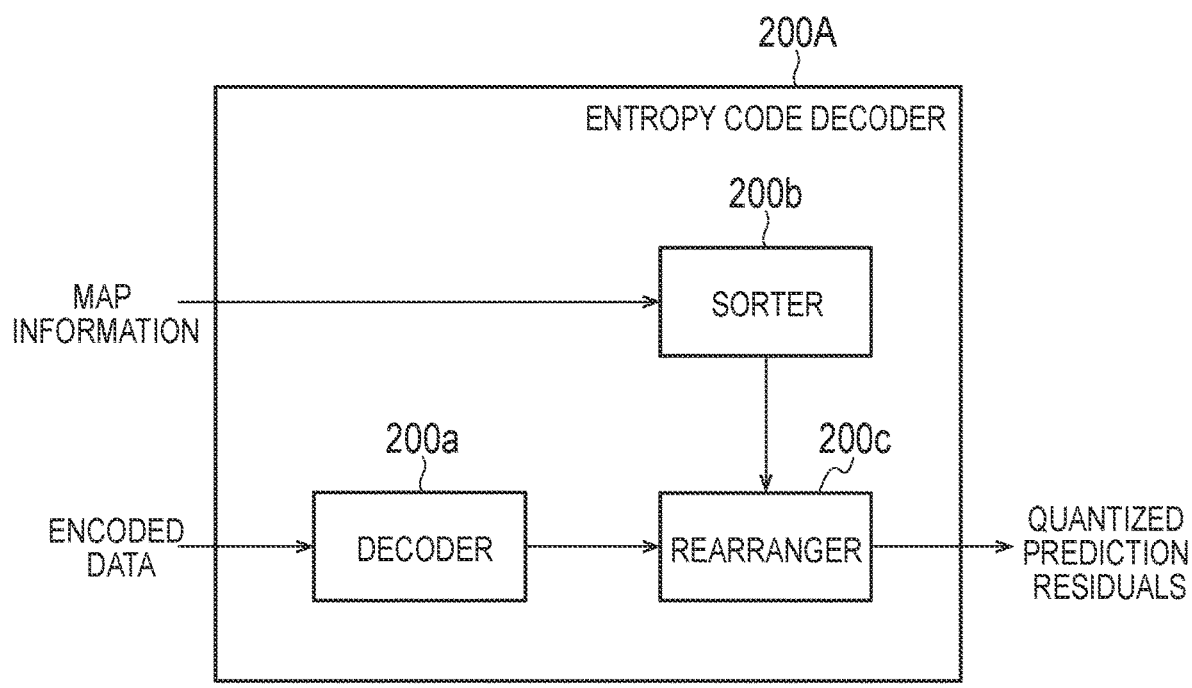
FIG. 9 illustrates an example of a configuration of an entropy code decoder according to the embodiment.

FIG. 9 illustrates an example of a configuration of the entropy code decoder 200A. As illustrated in FIG. 9, the entropy code decoder 200A includes a decoder 200a, a sorter 200b, and a rearranger 200c.

The decoder 200a decodes the encoded data generated by the image encoding device 1A to acquire the prediction residual sequence (quantized prediction residuals) and information on prediction (intra prediction and motion compensation prediction), outputs the prediction residual sequence to the rearranger 200c, and outputs the information on prediction to the intra predictor 203 and the motion compensation predictor 206. The decoder 200a may determine to perform rearrangement based on the degree-of-accuracy map if the transform skip flag acquired from the encoded data indicates application of transform skip and the information on prediction indicates bi-prediction.

The sorter 200b rearranges the degrees of accuracy Rij in the degree-of-accuracy map input from the evaluator 208 in ascending order. As the degrees of accuracy Rij are two-dimensionally arrayed in the degree-of-accuracy map, the sorter 200b serializes the degree-of-accuracy map by zigzag scan, for example, into a degree-of-accuracy sequence. Then, the sorter 200b rearranges the degrees of accuracy Rij in ascending order, and outputs to the rearranger 103b degree-of-accuracy index information, in which the index i and each pixel position (the X-coordinate position and the Y-coordinate position) are associated with each other, where the index i is the degree of accuracy Rij.

The rearranger 200c performs the reverse processing of the rearrangement processing performed by the rearranger 103b of the image encoding device 1A. The rearranger 200c deserializes the prediction residual sequence which is input from the decoder 200a by rearranging it based on the index i and coordinate values (pixel positions) input from the sorter 200b, for the transform skip block. The rearranger 200c outputs two-dimensionally arrayed prediction residuals to the inverse quantizer 201a.

Note that the entropy code decoder 200A performs rearrangement processing by the degree of accuracy only when motion compensation prediction using a plurality of reference images is applied. In other modes such as in unidirectional prediction and intra prediction processing, the entropy code decoder 200A does not have to perform rearrangement processing by the degree of accuracy.

7. Image Encoding Operations

Figure 10:
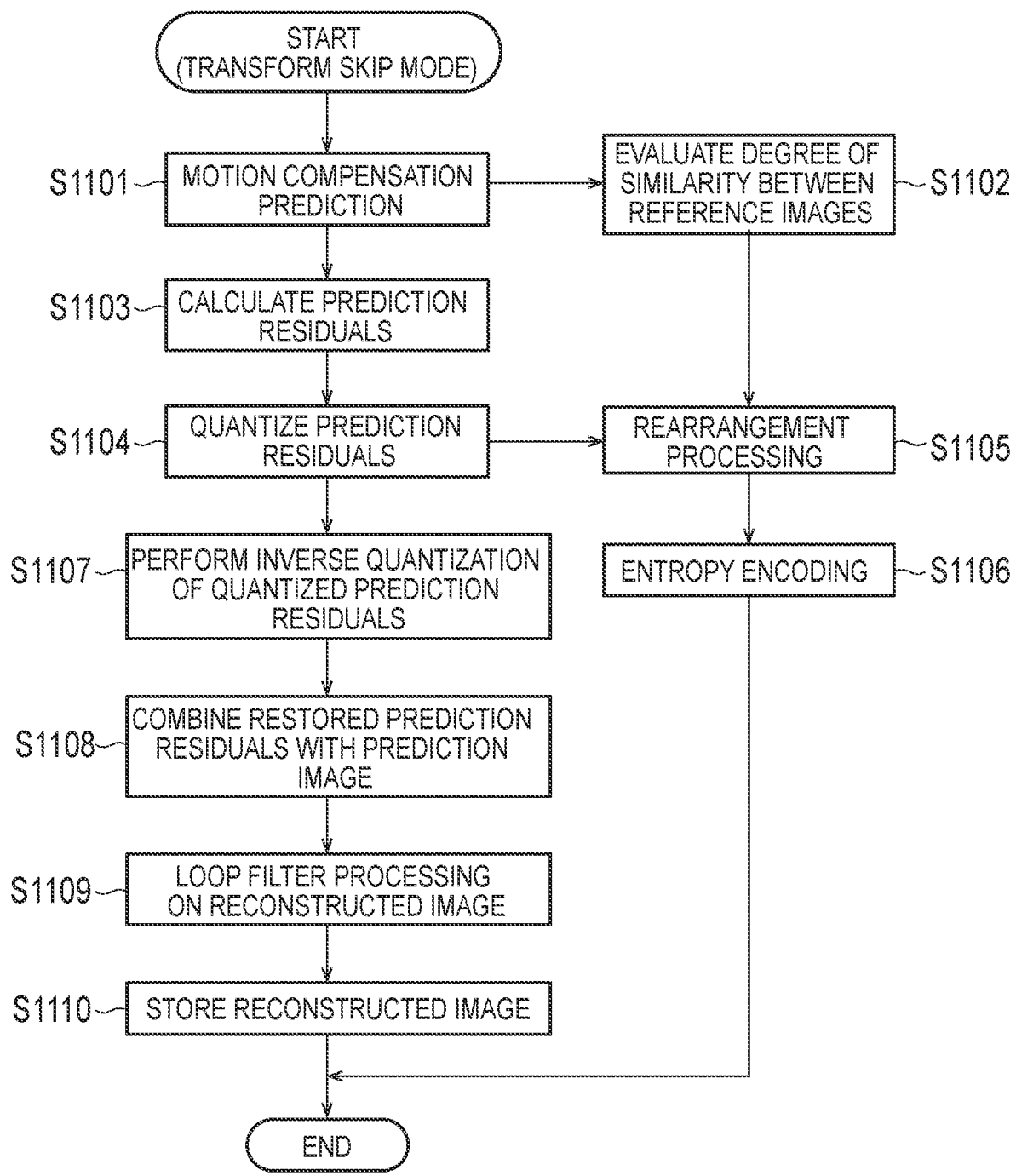
FIG. 10 illustrates a processing flow at the image encoding device according to the embodiment.

FIG. 10 illustrates a processing flow at the image encoding device 1A according to the embodiment. The image encoding device 1A carries out this processing flow when the transform skip mode and motion compensation prediction are applied to the target image block.

As illustrated in FIG. 10, in step S1101, the motion compensation predictor 109 predicts the target image block by performing motion compensation prediction using a plurality of reference images. The motion compensation predictor 109 generates a prediction image corresponding to the target image block.

In step S1102, the evaluator 111 evaluates the degree of similarity between the plurality of reference images at each pixel position, and generates a degree-of-accuracy map indicating the degree of accuracy of prediction (prediction accuracy) at each pixel position in the block.

In step S1103, the subtractor 101 calculates the prediction residual indicating a difference between the target image block and the prediction image in a pixel unit.

In step S1104, the quantizer 102b generates quantized prediction residuals by performing quantization on the prediction residuals calculated by the subtractor 101.

In step S1105, the rearranger 103b of the entropy encoder 103A rearranges the prediction residuals input from the quantizer 102b in ascending order of the degree of accuracy (i.e., ascending order of the degree of similarity between the prediction residuals) based on the result of evaluation by the evaluator 111 (the degree-of-accuracy map).

In step S1106, the encoder 103c of the entropy encoder 103A encodes the prediction residuals rearranged in the ascending order of the degree of accuracy by entropy encoding, and outputs the encoded data.

In step S1107, the inverse quantizer 104b performs inverse quantization of the prediction residuals input from the quantizer 102b to restore the prediction residuals and generate restored prediction residuals.

In step S1108, the combiner 105 combines the restored prediction residuals with the prediction image on a pixel-by-pixel basis to reconstruct the target image block and generates a reconstructed image.

In step S1109, the loop filter 107 performs filter processing on the reconstructed image.

In step S1110, the frame memory 108 stores the reconstructed image after the filter processing in a frame unit.

8. Image Decoding Operations

Figure 11:
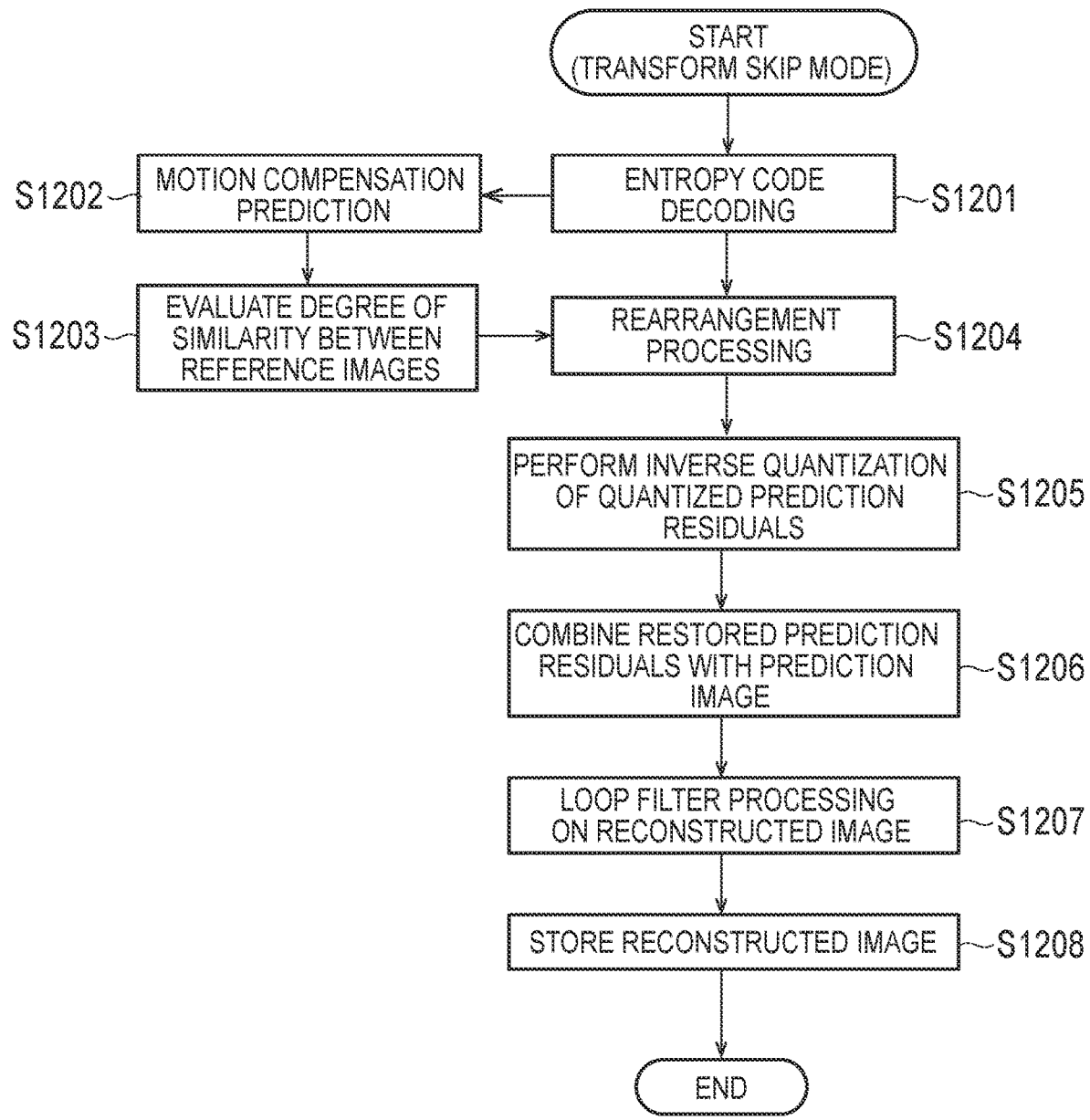
FIG. 11 illustrates a processing flow at the image decoding device according to the embodiment.

FIG. 11 illustrates a processing flow at the image decoding device 2A according to the embodiment. The image decoding device 2A carries out this processing flow when the transform skip mode and motion compensation prediction are applied to the target image block.

As illustrated in FIG. 11, in step S1201, the decoder 200a of the entropy code decoder 200A decodes the encoded data to acquire motion vector information and outputs the acquired motion vector information to the motion compensation predictor 206.

In step S1202, the motion compensation predictor 206 predicts the target image block by performing motion compensation prediction using a plurality of reference images based on the motion vector information to generate the prediction image corresponding to the target image block.

In step S1203, the evaluator 208 calculates the degree of similarity between the plurality of reference images for each pixel position and generates a degree-of-accuracy map indicating the degree of accuracy of prediction (prediction accuracy) at each pixel position in the block.

In step S1204, the decoder 200a of the entropy code decoder 200A decodes the encoded data to acquire the prediction residual sequence. The rearranger 200c of the entropy code decoder 200A rearranges the prediction residual sequence and outputs two-dimensionally arrayed prediction residuals to the inverse quantizer 201a.

In step S1205, the inverse quantizer 201a performs inverse quantization of the prediction residuals (quantized prediction residuals) to restore the prediction residuals and generate restored prediction residuals.

In step S1206, the combiner 202 combines the restored prediction residuals with the prediction image on a pixel-by-pixel basis to reconstruct the target image block and generates a reconstructed image.

In step S1207, the loop filter 204 performs filter processing on the reconstructed image.

In step S1208, the frame memory 205 stores and outputs the reconstructed image subjected to the filter processing in a frame unit.

9. Conclusion of the Embodiment

At the image encoding device 1A, the evaluator 111 evaluates the degree of similarity between the plurality of reference images on a pixel-by-pixel basis and outputs information on the result of evaluation to the entropy encoder 103A. The entropy encoder 103A sequentially encodes the prediction residuals input from the quantizer 102b starting from a pixel position at which the degree of similarity between the reference images is low based on the result of evaluation by the evaluator 111. By sequentially encoding the prediction residuals starting from a pixel position at which the degree of similarity between the reference images is low, significant coefficients can be preferentially encoded and an end flag can be set earlier. Thus, efficient entropy encoding can be performed on the transform skip block and encoding efficiency can be improved.

At the image decoding device 2A, the evaluator 208 evaluates the degree of similarity between a plurality of reference images on a pixel-by-pixel basis, and outputs information on the result of evaluation to the entropy code decoder 200A. The entropy code decoder 200A decodes encoded data to acquire the prediction residuals on a pixel-by-pixel basis, and rearranges the prediction residuals based on the result of evaluation by the evaluator 208 and outputs them. In this manner, rearranging the prediction residuals based on the result of evaluation by the evaluator 208 allows the entropy code decoder 200A to autonomously rearrange the prediction residuals without transmission of information specifying the details of rearrangement from the image encoding device. This can avoid reduction in encoding efficiency because it is not necessary to transmit information specifying the details of rearrangement from the image decoding device 1.

10. Modification 1

The evaluator 111 of the image encoding device 1A and the evaluator 208 of the image decoding device 2A may generate an error map in the manner shown below and input it to the rearranger 112. In the case of inputting the error map to the rearranger 112, the rearranger 112 performs rearrangement of the prediction residuals regarding an area of the error map having a large value as an area with low degree of similarity and an area of the error map having a small value as an area with high degree of similarity.

Given that luminance signals for two reference images (reference-to blocks) used for generating a prediction image in a bi-prediction mode are L0[i, j] and L1[i, j] (where [i, j] is a coordinate in the target image block), an error map map[i, j] and its maximum value max_map are calculated according to Expression (3):

$$map[i,j]=abs(L0[i,j]-L1[i,j])$$

$$max\_map=max(map[i,j]) \quad (3)$$

If max_map in Expression (3) exceeds 6-bit accuracy (exceeds 64), the error map and the maximum value are updated with shift which is configured so that max_map fits in 6-bit accuracy according to Expression (4):

$$max\_map=max\_map>>shift$$

$$map[i,j]=map[i,j]>>shift \quad (4)$$

11. Modification 2

The motion compensation predictor 109 of the image encoding device 1A and the motion compensation predictor 208 of the image decoding device 2A may be able to divide the target image block (CU) into a plurality of small blocks, apply different motion vectors to the respective small blocks, and switch between one-way prediction and bi-prediction for each small block. In such a case, regarding a CU for which a prediction image is generated using both one-way prediction and bi-directional prediction, the evaluator 111 of the image encoding device 1A and the evaluator 208 of the image decoding device 2A may not calculate the degree-of-accuracy map. In contrast, in a case of generating prediction images by bi-prediction for all of the small blocks, the evaluator 111 of the image encoding device 1A and the evaluator 208 of the image decoding device 2A generate degree-of-accuracy maps.

Also, the motion compensation predictor 109 of the image encoding device 1A and the motion compensation predictor 208 of the image decoding device 2A may perform Oover-lapped Block Motion Compensation (OBMC) in order to reduce discontinuity between prediction images at a boundary of blocks with different motion vectors. The evaluator 111 of the image encoding device 1A and the evaluator 208 of the image decoding device 2A may also take into account correction of reference pixels by OBMC in generation of the degree-of-accuracy map.

Figure 12:
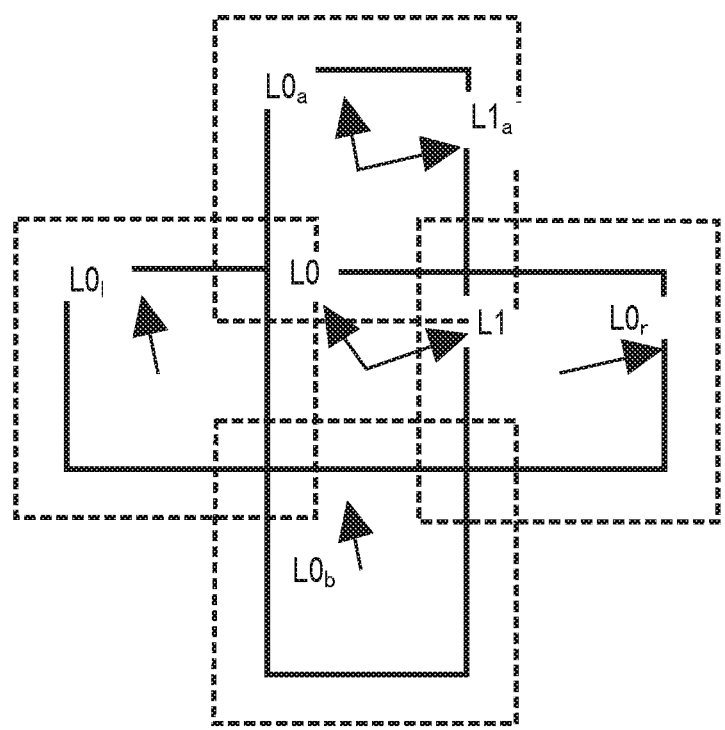
FIG. 12 illustrates an example of overlapped motion compensation according to Modification 1 of the embodiment.

For example, if the prediction mode for surrounding blocks used for correction with OBMC is bi-prediction, the evaluator 111 of the image encoding device 1A and the evaluator 208 of the image decoding device 2A correct the degree-of-accuracy map using the motion vectors of the reference images (L0 and L1) that are used for generating prediction images by bi-prediction for surrounding blocks, for an area of a prediction image that is affected by the correction with OBMC. Specifically, for a block boundary area, if the motion vector with an adjacent block is bi-prediction, position-dependent weighted averaging with the degree-of-accuracy map for the adjacent block is performed. When the adjacent block is in the intra mode or one-way prediction, no correction of the degree-of-accuracy map is made. In the case of FIG. 12, a degree-of-accuracy map is generated with $L0_a$ and $L1_a$ for the upper block boundary, and for the area below it (the area overlapping the CU in question), weighted averaging with the degree-of-accuracy map for the CU in question is made. Since the prediction modes for the lower, the right, and the left CUs are one-way prediction, no correction of the degree-of-accuracy map is made for areas that overlap those CUs.

12. Modification 3

While the embodiment above described an example of rearranging prediction residuals on a pixel-by-pixel basis, the prediction residuals may be rearranged in pixel group (small block) units. Such a small block is a block consisting of 4×4 pixels, sometimes referred to as CG.

Figure 13:
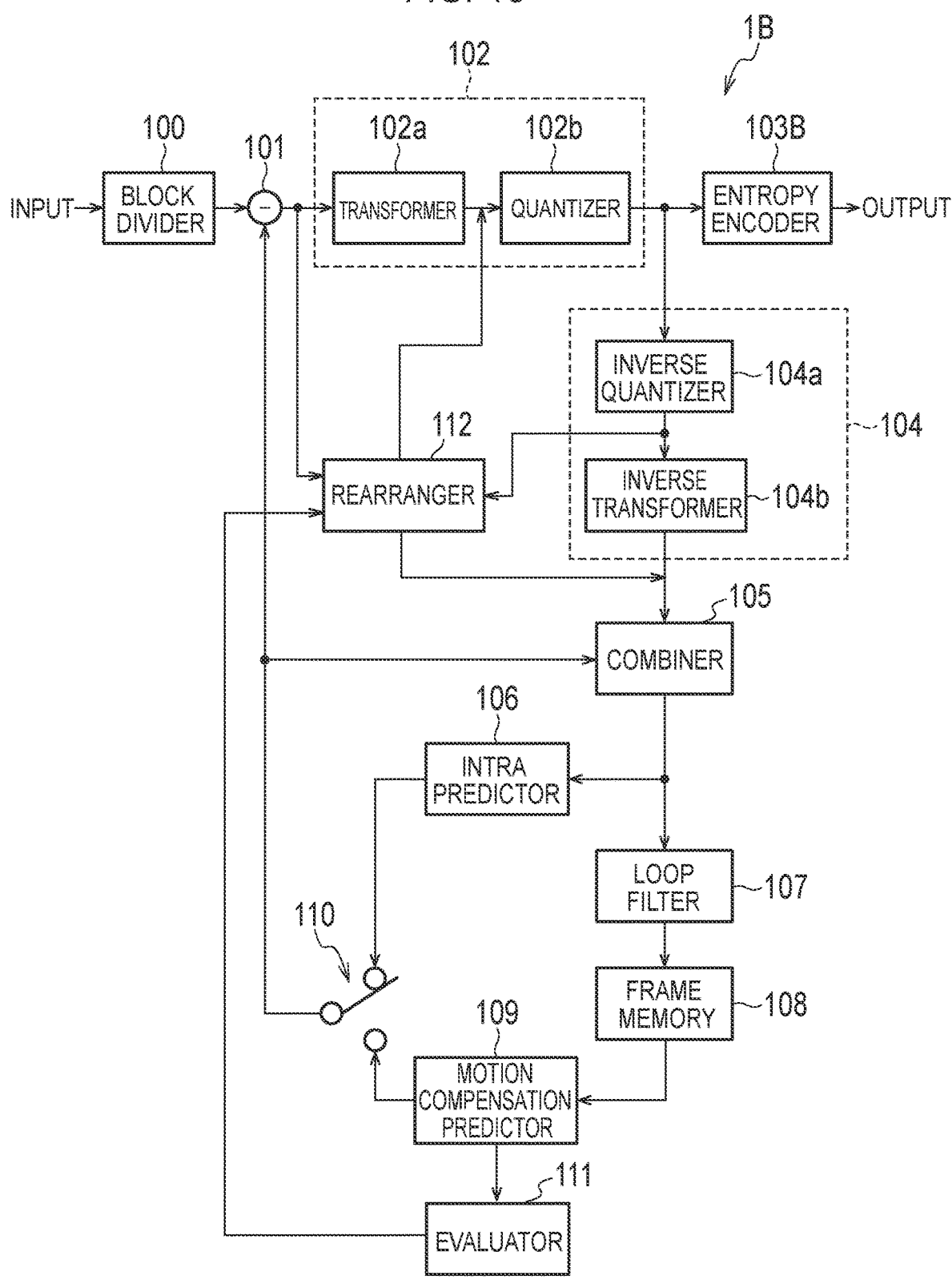
FIG. 13 illustrates a configuration of an image encoding device according to Modification 3 of the embodiment.

FIG. 13 illustrates a configuration of an image encoding device 1B according to Modification 3 of the embodiment. As illustrated in FIG. 13, the image encoding device 1B includes a rearranger 112 configure to rearrange the prediction residuals in pixel group (small block) units. In a case where the target image block (CU) is one for which a prediction image is generated using bi-prediction and to which the transform skip mode is applied, the rearranger 112 performs rearrangement in a unit of small blocks (4×4) on the prediction residuals for the CU based on the error map discussed above.

FIG. 14 illustrates an example of operations of the rearranger 112 according to Modification 3 of the embodiment.

As illustrated in FIG. 14A, the subtractor 101 of the image encoding device 1B calculates a prediction residual corresponding to the CU. In the example of FIG. 14A, a prediction residual exists in an upper right area in the CU. The upper right area in the CU can be considered to be an area where the degree of similarity between the reference images is low and the prediction accuracy (degree of accuracy) is low.

As illustrated in FIG. 14B, the evaluator 111 or the rearranger 112 of the image encoding device 1B divides the error map into a unit of 4×4 CGs and calculates an average value CGmap of errors in a CG unit according to Expression (5):

[Math. 1]

$$CGmap[i >> 2, j >> 2] = \left( \sum_{i,j \in CG} map[i, j] \right) >> 4 \quad (5)$$

Then, the rearranger 112 rearranges the CGs in descending order of the average value CGmap of errors and gives them indices. In other words, the rearranger 112 rearranges the CGs in ascending order of the degree of similarity between the reference images and gives them indices. In the example of FIG. 14B, the numbers in the respective CGs indicate indices after rearrangement. Since the average value CGmap for the CGs in the upper right area is large, high priorities for scanning (encoding) are set. Next, the rearranger 112 rearranges the CGs such that they are scanned (encoded) in ascending order of the indices as illustrated in FIG. 14C. As a result, the rearranger 112 outputs prediction residuals which have been rearranged in a CG unit as illustrated in FIG. 14D to the quantizer 102b.

The quantizer 102b performs quantization on the prediction residuals input from the rearranger 112, and outputs the quantized prediction residuals to the entropy encoder 103B. The entropy encoder 103B encodes the CGs in descending order of the average value CGmap of errors to generate encoded data.

The rearranger 112 performs rearrangement on the restored prediction residuals output by the inverse quantizer 104a in a CG unit so as to put them back into the original order of CGs, and outputs the restored prediction residuals rearranged in a CG unit to the combiner 105.

Figure 15:
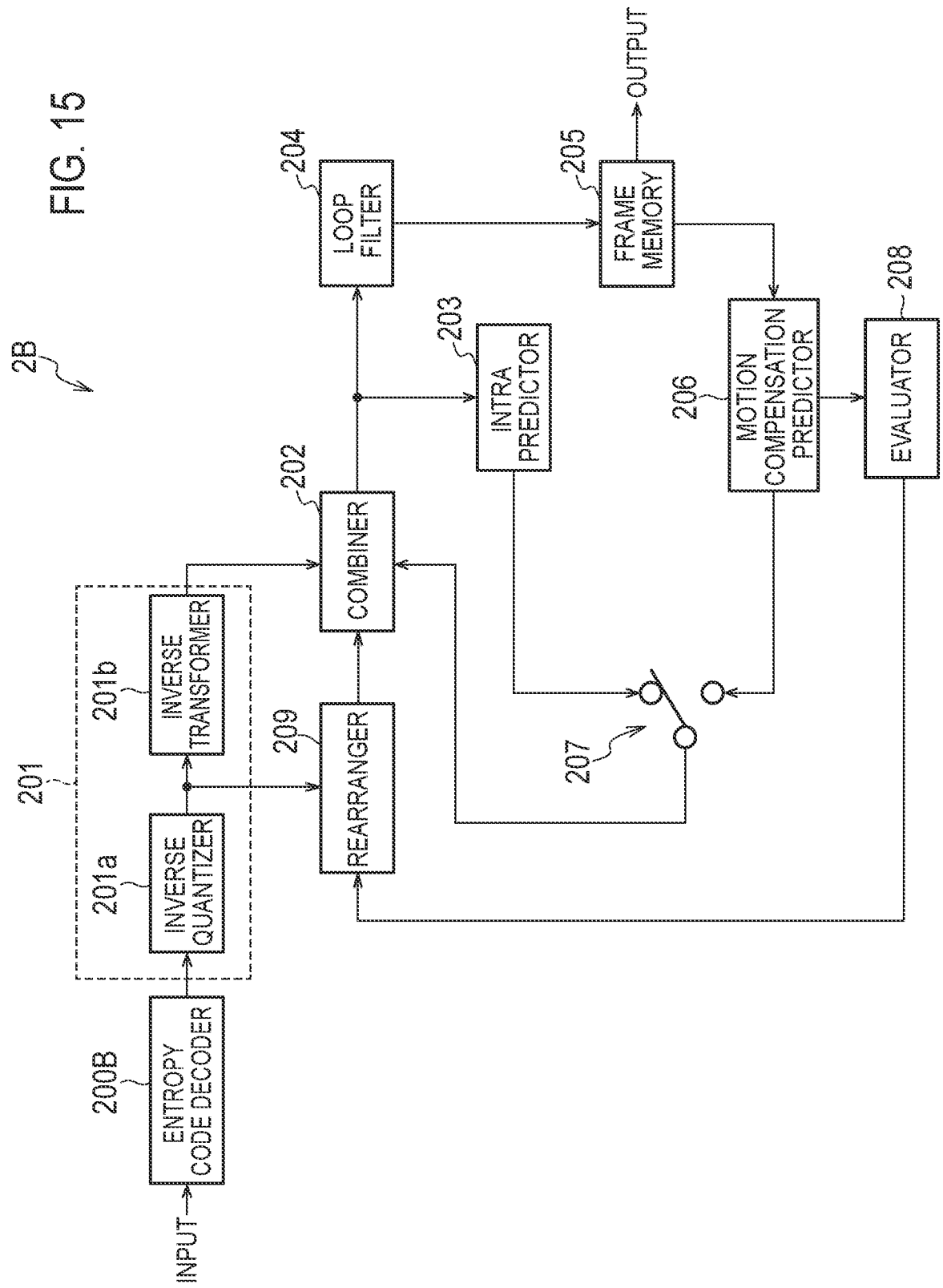
FIG. 15 illustrates a configuration of an image decoding device according to Modification 3 of the embodiment.

FIG. 15 illustrates a configuration of an image decoding device 2B according to Modification 3 of the embodiment. As illustrated in FIG. 15, the image decoding device 2B includes a rearranger 209 for rearranging the restored prediction residuals output by the inverse quantizer 201a in a CG unit.

In a case where the target image block (CU) is one for which a prediction image is generated using bi-prediction and to which the transform skip mode is applied, the rearranger 209 performs rearrangement in a CG unit on the prediction residuals for the CU based on the error map discussed above.

Specifically, the evaluator 208 or the rearranger 209 of the image decoding device 2B divides the error map into a unit of 4×4 CGs and calculates the average value CGmap of errors in a CG unit according to the Expression (5) above. Then, the rearranger 209 performs the reverse processing of the rearrangement processing performed by the rearranger 112 of the image decoding device 2A based on the average value CGmap of errors in a CG unit, and outputs the rearranged prediction residuals to the combiner 202.

13. Modification 4

While the embodiment above described an example of rearranging the prediction residuals in pixel units or in small block units, the prediction residuals may be rearranged so that they are inverted horizontally or vertically, or horizontally and vertically.

Figure 16:
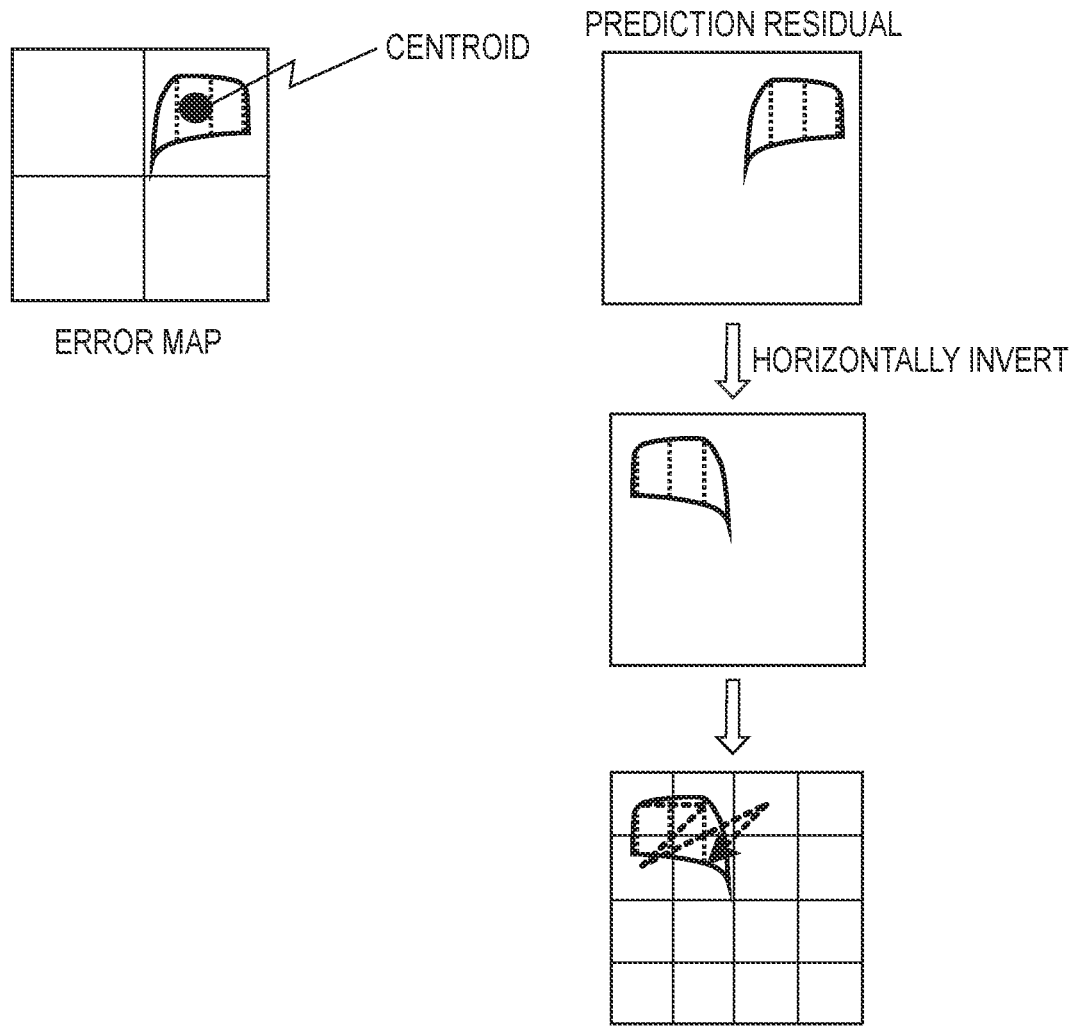
FIG. 16 illustrates an example of operations of the rearranger according to Modification 4 of the embodiment.

As illustrated in FIG. 16, the subtractor 101 of the image encoding device 1B calculates the prediction residual corresponding to the target image block. In the example of FIG. 16, a prediction residual exists in the upper right area of the target image block. The upper right area of the target image block can be considered to be an area where the degree of similarity between the reference images is low and the prediction accuracy (degree of accuracy) is low.

The rearranger 112 in Modification 4 of the embodiment calculates a centroid of the error map according to Expression (6):

[Math. 2]

$$g_i = \frac{\sum_{[i,j] \in map} map[i, j] * i}{width} \quad (6)$$

$$g_j = \frac{\sum_{[i,j] \in map} map[i, j] * j}{height}$$

If a centroid ($g_i$, $g_j$) of the error map calculated is located in the upper right area of the map, that is, given that the upper left coordinate is (0, 0) and the lower right coordinate is (m, n), if $$\frac{n}{2} < g_i < n \quad \text{[Math. 3]}$$

and $$0 < g_j \leq \frac{m}{2}, \quad \text{[Math. 4]}$$

the rearranger 112 inverts the prediction residual horizontally.

If the centroid of the error map is located in the lower left area, that is, if $$0 < g_i < \frac{n}{2} \quad \text{[Math. 5]}$$

-continued and $$\frac{m}{2} < g_j \le m,$$ [Math. 6]

the rearranger 112 inverts the prediction residual vertically.

If the centroid of the error map is located in the lower right area, that is, if $$\frac{n}{2} < g_i < n$$ [Math. 7]

and $$\frac{m}{2} < g_j \le m,$$ [Math. 8]

the rearranger 112 inverts the prediction residual horizontally and vertically.

When the centroid of the error map is in the lower right area, the rearranger 112 may be configured to rotate the prediction residual by 180 degrees instead of inverting the prediction residual horizontally and vertically, or may be configured to change the scanning order in encoding of the coefficients so that it proceeds from lower right to upper left instead of from upper left to lower right.

Also, for reduction of processing, the position of the maximum value in the error map is searched without calculating the centroid of the error map, and the aforementioned inversion processing may be applied regarding the position of the maximum value as the centroid of the error map.

The prediction residuals to which the prediction residual inversion processing has been applied by the rearranger 112 according to Modification 4 of the embodiment are output to the quantizer 102b.

The quantizer 102b performs quantization on the prediction residuals input from the rearranger 112 and outputs the quantized prediction residuals to the entropy encoder 103B. The entropy encoder 103B encodes the prediction residuals in the order of from the upper left area to the lower right area to generate encoded data.

The rearranger 112 performs prediction residual inversion processing on the restored prediction residuals which are output by the inverse quantizer 104a based on the position of the centroid of the error map, and outputs the rearranged restored prediction residuals to the combiner 105.

14. Other Embodiments

The embodiment above described an example in which the entropy encoder 103A reads out all of the two-dimensionally arrayed prediction residuals in ascending order of the degree of accuracy and performs serialization processing. However, only first several ones of the two-dimensionally arrayed prediction residuals may be read out in ascending order of the degree of accuracy, and the other prediction residuals may be read out in a fixed order defined in a system. Alternatively, for the two-dimensionally arrayed prediction residuals, the order of reading-out may be moved forward or backward by a predetermined number according to the degree of accuracy.

The embodiment above was mainly described for inter prediction as motion compensation prediction. In inter prediction, a reference image in a frame different from the current frame is used in prediction of the target image block for the current frame. However, a technique called intra block copy is also applicable as motion compensation prediction. In intra block copy, a reference image in the same frame as the current frame is used in prediction of the target image block for the current frame.

A program for causing a computer to execute the processing performed by the image encoding device 1A and 1B, and a program for causing a computer to execute the processing performed by the image decoding device 2A and 2B may be provided. Also, the programs may be recorded in a computer readable medium. Using the computer readable medium, the programs can be installed on computers. Here, the computer readable medium having the programs recorded therein may be a non-transitory recording medium. The non-transitory recording medium may be, but not limited to, a recording medium such as a CD-ROM and a DVD-ROM, for example. It is also possible to integrate circuits for executing the processing performed by the image encoding device 1A and 1B so that the image encoding device 1A and 1B is configured as a semiconductor integrated circuit (chipset, SoC). Likewise, it is also possible to integrate circuits for executing the processing performed by the image decoding device 2A and 2B so that the image decoding device 2A and 2B is configured as a semiconductor integrated circuit (chipset, SoC).

While embodiments have been described in detail with reference to the drawings, specific configurations are not limited to the ones mentioned above and various design changes and the like can be made without departing from the scope of the invention.

Japanese Patent Application No. 2018-65880 (filed on Mar. 29, 2018) is incorporated herein in its entirety by reference.

The invention claimed is:

1. An image decoding device for decoding a block-based target image from encoded data, the image decoding device comprising:
   an inter predictor configured to generate a block of a prediction image corresponding to a block of the target image by performing a bi-directional prediction using a plurality of reference images;
   an evaluator configured to calculate, for each small block, an evaluation value indicating a degree of similarity between the plurality of reference images, wherein the small block is a unit smaller than the block and consists of a plurality of pixels;
   a decoder configured to decode the encoded data to acquire prediction residuals corresponding to the target image;
   a combiner configured to combine the acquired prediction residuals with the block of the prediction image to reconstruct the block of the target image; and
   a modifier configured to use the evaluation value calculated by the evaluator to modify a combining target of the combiner in a unit of the small block.

2. An image decoding method for decoding a block-based target image from encoded data, the image decoding method comprising:
   generating a block of a prediction image corresponding to a block of the target image by performing a bi-directional prediction using a plurality of reference images;
   calculating, for each small block, an evaluation value indicating a degree of similarity between the plurality of reference images, wherein the small block is a unit smaller than the block and consists of a plurality of pixels;

decoding the encoded data to acquire prediction residuals corresponding to the target image;
combining the acquired prediction residuals with the block of the prediction image to reconstruct the block of the target image; and
using the evaluation value to modify a combining target of the combining in a unit of the small block.

* * * * *